US009880068B2

(12) United States Patent
Gower et al.

(10) Patent No.: US 9,880,068 B2
(45) Date of Patent: Jan. 30, 2018

(54) METHOD OF TESTING

(71) Applicant: ROLLS-ROYCE PLC, London (GB)

(72) Inventors: Ian Richard Gower, Chepstow (GB); Michael Frederick Bryant, Bristol (GB)

(73) Assignee: ROLLS-ROYCE plc, London (GB)

( * ) Notice: Subject to any disclaimer, the term of this patent is extended or adjusted under 35 U.S.C. 154(b) by 229 days.

(21) Appl. No.: 14/800,153

(22) Filed: Jul. 15, 2015

(65) Prior Publication Data
US 2016/0047709 A1 Feb. 18, 2016

(30) Foreign Application Priority Data

Aug. 14, 2014 (GB) .................. 1414419.0

(51) Int. Cl.
*G01M 7/02* (2006.01)
*G01M 5/00* (2006.01)
(Continued)

(52) U.S. Cl.
CPC .......... *G01M 7/022* (2013.01); *G01M 5/0016* (2013.01); *G01M 5/0033* (2013.01);
(Continued)

(58) Field of Classification Search
CPC ............. G01N 2203/0073; G01N 3/32; G01N 2291/0258; G01M 7/022; G01M 5/0016;
(Continued)

(56) References Cited

U.S. PATENT DOCUMENTS 3,214,969 A 11/1965 Swanson
3,911,733 A * 10/1975 Bhuta ................... G01B 9/021
356/35.5
(Continued)

FOREIGN PATENT DOCUMENTS

DE 11 17 913 B 11/1961
EP 2 423 659 A1 2/2012
(Continued)

OTHER PUBLICATIONS

Translation of JP58-211627, 4 pgs.*
(Continued)

*Primary Examiner* — Helen Kwok
*Assistant Examiner* — Nashimiya Fayyaz
(74) *Attorney, Agent, or Firm* — Oliff PLC

(57) ABSTRACT

The present invention provides processes by which fatigue testing can be carried out by altering the vibrational characteristics of a component, but without physically altering the component itself. In particular the invention provides a method of performing high-cycle fatigue testing on a component, the method including the steps of: attaching one or more masses to the component to alter the stress distribution of the component under vibration; and carrying out high-cycle fatigue testing by exciting the component at a low fundamental frequency of the component. The component can then be tested at a low frequency, which is easier to excite, but fail in a position of the component characteristic of a more complex modeshape.

2 Claims, 4 Drawing Sheets

(51) Int. Cl.
*G01M 7/00* (2006.01)
*G01M 15/14* (2006.01)

(52) U.S. Cl.
CPC ............ *G01M 5/0066* (2013.01); *G01M 7/00* (2013.01); *G01M 15/14* (2013.01)

(58) Field of Classification Search
CPC .... G01M 5/0033; G01M 5/0066; G01M 7/00; G01M 15/14
USPC .......................................... 73/660, 577, 810
See application file for complete search history.

(56) References Cited

U.S. PATENT DOCUMENTS

| | | | |
|---|---|---|---|
| 6,330,985 | B1 | 12/2001 | Manteiga et al. |
| 6,601,456 | B1 | 8/2003 | Davidson et al. |
| 6,813,960 | B1 | 11/2004 | Owen et al. |
| 7,016,825 | B1 * | 3/2006 | Tryon, III ........... G06F 17/5018 702/182 |
| 2010/0263448 | A1 * | 10/2010 | Hughes .................. F03D 1/065 73/577 |
| 2010/0278633 | A1 | 11/2010 | Duong et al. |

FOREIGN PATENT DOCUMENTS

| | | | |
|---|---|---|---|
| JP | 58-211627 | * | 12/1983 |
| WO | 2004/005879 | A1 | 1/2004 |
| WO | 2014161858 | A1 | 10/2014 |

OTHER PUBLICATIONS

Nov. 17, 2014 Search Report issued in British Application No. GB1414419.0.

Nov. 25, 2015 Search Report issued in European Patent Application No. 15 17 6739.

* cited by examiner

METHOD OF TESTING

FIELD OF THE INVENTION

The present invention relates to a method of component testing. The invention is particularly, but not exclusively, concerned with a method for failure-testing components in complex vibration modes.

BACKGROUND OF THE INVENTION

In complex products, such as gas turbine engines, it is common to test components extensively prior to manufacture.

For many components a major form of testing is high cycle fatigue ("HCF") testing. This generally relates to situations where more than $10^4$ cycles are required before failure, the stress is low and the deformation experienced is primarily elastic.

Until now, HCF fatigue testing has typically been carried out either on a whole component, or a part of that component, the part being obtained by either extracting a sub-component or by machining away part of the original component. That component or sub-component would then be tested by exciting it at its resonant frequency or by forcing it into a 'flutter' type mode, until the component started to fail.

However, components are difficult to excite in complex vibration mode shapes, which often occur at higher frequencies, because of the increased energy required to drive them to exhibit such vibration modes. In particular the drive system used in the testing, which may be a chopped air jet, a piezo-electric exciter, an electro-mechanical shaker, a constant air-jet which causes an aero-elastic instability such as flutter, typically is not able to supply the necessary energy to drive the component at high frequencies.

SUMMARY OF THE INVENTION

At their broadest, aspects of the present invention provide processes by which fatigue testing can be carried out by altering the vibrational characteristics of a component, but without physically altering the component itself.

A first aspect of the present invention provides a method of performing high-cycle fatigue testing on a component, the method including the steps of: attaching one or more masses to the component to alter the stress distribution of the component under vibration; and carrying out high-cycle fatigue testing by exciting the component at a low fundamental frequency of the component.

The component can then be tested at a low frequency, which is easier to excite, but fail in a position of the component characteristic of a more complex modeshape.

As the component is much easier to excite, this can mean a greatly reduced time on test therefore reducing cost, as there is less time taken to set up each test, and there is greater reliability in achieving a result. In some cases, such as if a defect in the material is identified, this is the only way to test for failure in the position of that defect. This could allow acceptance of such defects, and therefore potentially remove the need to scrap expensive components with such defects.

Optional features of the invention will now be set out. These are applicable singly or in any combination with any aspect of the invention.

In certain embodiments the low fundamental frequency is a frequency giving rise to the first flap or first torsion mode of vibration of the component.

Preferably the method further includes the step of determining the vibration characteristic of the component with said masses attached using a finite element model.

In one embodiment the finite element model includes determining the eigenvectors and eigenvalues of the equation $$[[K]-\omega^2[M]]\{X\}=0$$

wherein [M] is the mass matrix which describes the mass distribution of the component, [K] is the stiffness matrix which describes the stiffness distribution of the component, and {x} is the displacement vector, and wherein the addition of the mass or masses changes the mass matrix [M] without changing the stiffness matrix [K] and is thus used to tune the system for specific eigenvectors.

Both the eigenvalues and eigenvectors will change after addition of the masses, and the system can therefore be tuned for specific eigenvectors by altering the position and magnitude of the masses, forcing the component to fail at the required position.

The process can be used for vibration testing of any component, or system of components, where the vibrational characteristics of the component/system need to be changed, without changing the component itself.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
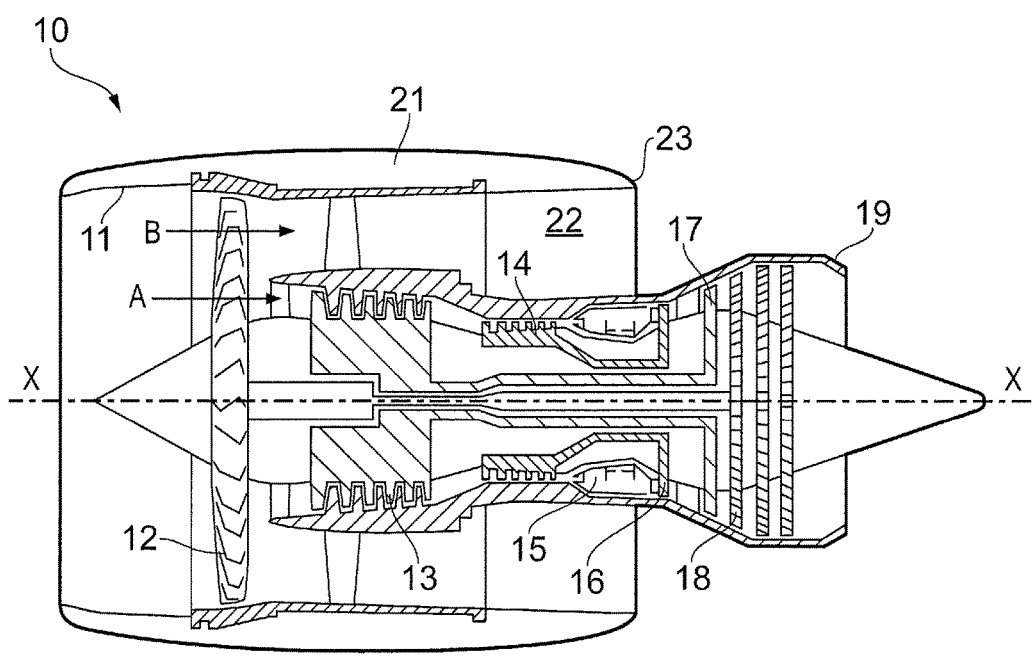
FIG. 1 shows a ducted fan gas turbine engine which incorporates components which may be the subject of testing according to embodiments of the present invention.

With reference to FIG. 1, a ducted fan gas turbine engine which incorporates many components which may be the subject of testing according to embodiments of the present invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Components which may be tested using methods according to embodiments of the present invention include, but are not limited to, the fan blades and turbine blades of the compressor and well as components making up the nacelle 21.

Figure 2A:
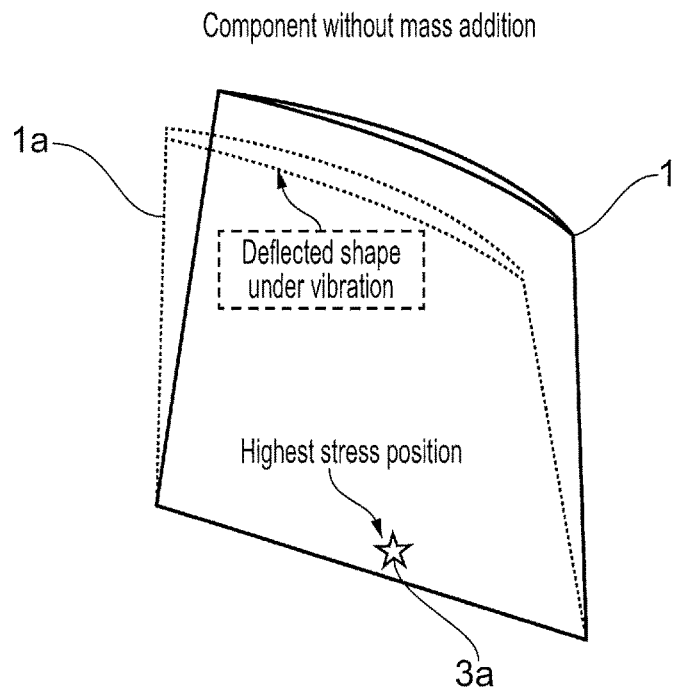
FIG. 2a shows the excitation of a component under HCF vibration testing in normal conditions.
Figure 2B:
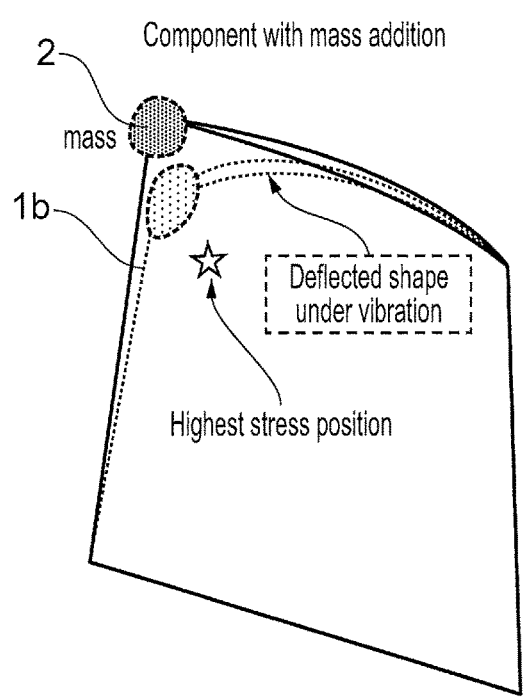
FIG. 2b shows the excitation of the same component as FIG. 2a under HCF vibration testing according to an embodiment of the present invention.
Figure 4:
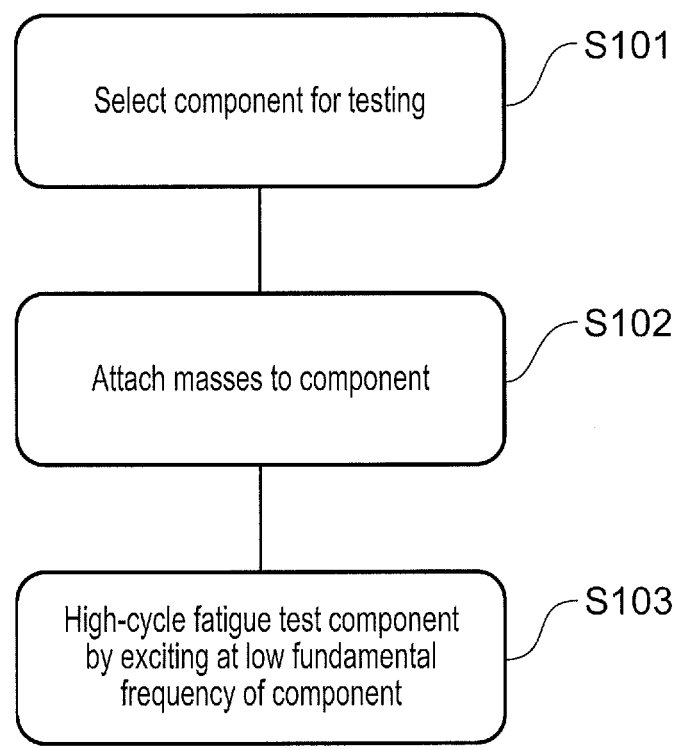
FIG. 4 is a flow chart showing the main steps in a method of testing according to an embodiment of the present invention.

An embodiment of the present invention provides a testing process by which the mode shape and stress/strain distribution of the existing complete component, such as a fan blade or a turbine blade, is altered by attaching one or more masses to the component (for example by bonding, mechanical fastener or magnetic interaction). FIG. 4 is a flowchart setting out the main steps in the method of this embodiment. FIGS. 2a and 2b show the component 1 in the two configurations.

In FIG. 2a, the component 1 has no mass addition and deflects under vibration as shown by dotted line 1a. This causes a position of highest stress 3a to be located near the base of the component.

In FIG. 2b, an additional mass 2 is added to the component 1 (step S102). This causes the component to deflect under vibration as shown by the dotted line 1b, which is in a different manner to the unaltered component shown in FIG. 2a. The vibration of the component 1 with the additional mass 2 causes a position of highest stress 3b to be located at a position closer to the upper edge of the component where the mass is positioned.

The new vibration characteristic can be calculated using a finite element model (including the additional masses) such as that set out below, and thus define the optimum positions to apply the masses in order to obtain the desired mode shapes. The FE model will predict modeshapes, frequencies and stresses for the original and modified component, allowing the effect of the additional masses, to be understood and the test to be defined using the modified component.

This allows the component to still be excited by traditional techniques, but at lower frequencies, e.g. that giving rise to the first flap or first torsion (1F or 1T) mode, whilst creating the stress distribution characteristic of a more complex high frequency mode. Therefore the modified fundamental mode is much easier to excite than a complex mode, but will give a failure position at a point on the component which would fail in a more complex mode, or at other points in the blade (or other component) where there are known features such as defects or residual stresses.

The component shown in FIG. 2b can thus be subject to high-cycle fatigue testing (step S103) by excitation at lower fundamental frequencies than would otherwise be required to create the appropriate stress distribution.

For the general vibration case where there is no damping and no applied forces (i.e. free vibration), the mass matrix [M] describes the mass distribution of the component, and the stiffness matrix [K] describes the stiffness distribution of the component, then if the displacement vector is $\{x\}$:

$$[M]\{\ddot{x}\}+[K]\{x\}=0$$

This differential equation can be solved by assuming the following type of solution:

$$\{x\}=\{X\}e^{-\omega t}$$

The equation then becomes:

$$[-\omega^2[M]+[K]]\{X\}e^{-i\omega t}=0$$

Since $e^{i\omega t}$ cannot equal zero the equation reduces to the following:

$$[[K]-\omega^2[M]]\{X\}=0$$

This is referred to an eigenvalue problem in mathematics and can be put in the standard format by pre-multiplying the equation by $[M]^{-1}$:

$$[[M]^{-1}[K]-\omega^2[M]^{-1}[M]]\{X\}=0$$

and if we let $[M]^{-1}[K]=[A]$ and $\lambda=\omega^2$:

$$[[A]-\lambda[I]]\{X\}=0$$

The solution to the problem results in N eigenvalues (i.e. $\omega_1^2, \omega_2^3, \ldots \omega_N^2$), where N corresponds to the number of degrees of freedom. The eigenvalues provide the natural frequencies of the system. When these eigenvalues are substituted back into the original set of equations, the values of $\{X\}$ that correspond to each eigenvalue are called the eigenvectors. These eigenvectors represent the mode shapes of the system.

The eigenvalues and eigenvectors are often written in the following matrix format and describe the modal model of the system:

$$\begin{bmatrix} \backslash & & \\ & \omega_r^2 & \\ & & \backslash \end{bmatrix} = \begin{pmatrix} \omega_1^2 & \cdots & 0 \\ \vdots & \ddots & \vdots \\ 0 & \cdots & \omega_N^2 \end{pmatrix}$$

And $$[\Psi]=[\{\psi_1\}\{\psi_2\} \ldots \{\psi_N\}]$$

With each eigenvector there is an associated modal strain and stress distribution, and the component will fail from fatigue in that mode at the point of maximum modal stress.

The experimental method according to the embodiment of the invention described above alters the mass matrix in the equations above, but without altering the component itself and therefore the stiffness matrix. Both the eigenvalues and eigenvectors will change after addition of the masses, and the system can therefore be 'tuned' for specific eigenvectors by altering the position and magnitude of the masses, forcing the component to fail at the required position.

Figure 3:
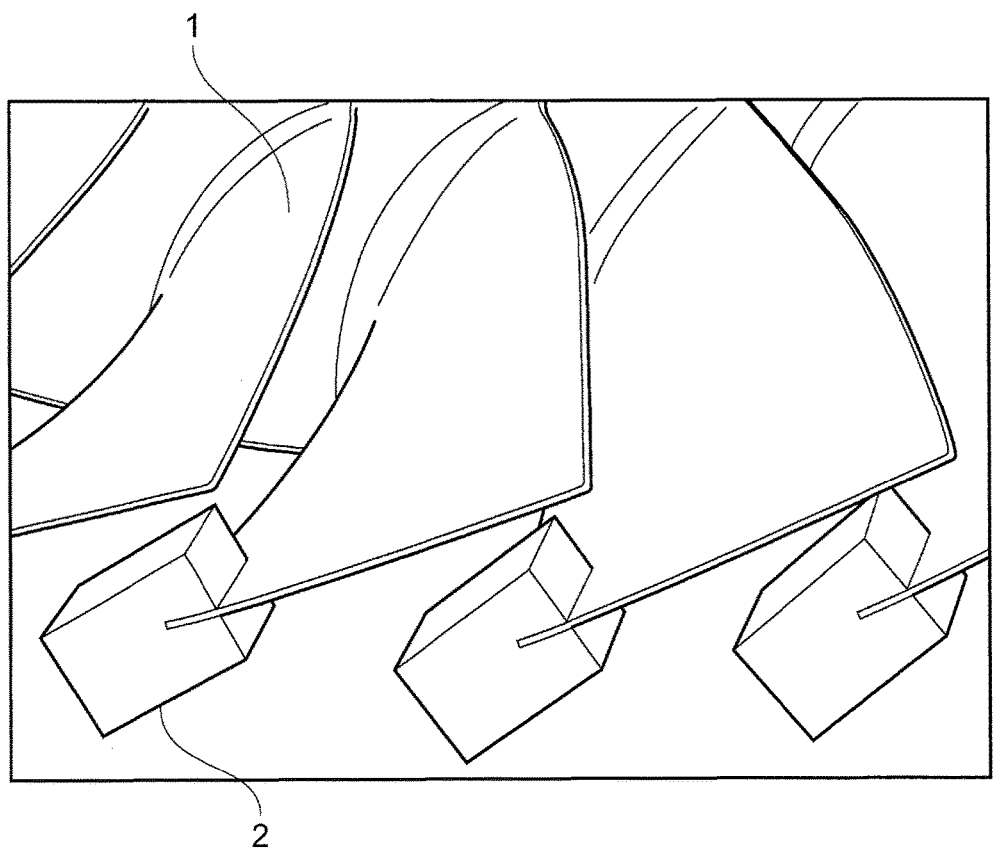
FIG. 3 shows a plurality of turbine blades with masses added for HCF vibration testing according to an embodiment of the present invention.

FIG. 3 shows a turbine aerofoil 1 where masses 2 have been added to induce a failure near the tip but in a fundamental (e.g. 1F) mode.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, the present invention is not limited to the testing of components of a gas turbine engine (or indeed an engine at all) but can be applied to a wide range of testing scenarios and components to be tested.

The invention claimed is:

1. A method of performing high-cycle fatigue testing on a component, the method including the steps of:
   attaching one or more masses to the component to alter the stress distribution of the component under vibration;
   determining a vibration characteristic of the component with the one or more masses attached using a finite element model; and
   carrying out high-cycle fatigue testing by exciting the component at a low fundamental frequency of the component,
   wherein the finite element model includes determining the eigenvectors and eigenvalues of the equation $$[[K]-\omega^2[M]]\{X\}=0$$

wherein [M] is a mass matrix which describes a mass distribution of the component, [K] is a stiffness matrix which describes a stiffness distribution of the component, and {x} is a displacement vector, and wherein attachment of the one or more masses changes the mass matrix [M] without changing the stiffness matrix [K] and is thus used to tune the system for specific eigenvectors.

2. The method according to claim 1 wherein the low fundamental frequency is a frequency giving rise to a first flap or first torsion mode of vibration of the component.

* * * * *